US010496571B1

(12) United States Patent
Lamba et al.

(10) Patent No.: US 10,496,571 B1
(45) Date of Patent: Dec. 3, 2019

(54) QUALITY OF SERVICE GUARANTEE IN A DISTRIBUTED STORAGE NETWORK

(71) Applicant: International Business Machines Corporation, Armonk, NY (US)

(72) Inventors: Amit H. Lamba, Buffalo Grove, IL (US); Praveen Viraraghavan, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/273,437

(22) Filed: Feb. 12, 2019

(51) Int. Cl.
*G06F 3/06* (2006.01)
*G06F 13/18* (2006.01)
*G06F 13/16* (2006.01)
*H04L 29/08* (2006.01)

(52) U.S. Cl.
CPC .............. *G06F 13/18* (2013.01); *G06F 3/061* (2013.01); *G06F 3/067* (2013.01); *G06F 3/0659* (2013.01); *G06F 13/1673* (2013.01); *H04L 67/1097* (2013.01)

(58) Field of Classification Search
CPC ........ G06F 3/0659; G06F 3/067; G06F 13/18; G06F 11/1076; H04L 67/1097
See application file for complete search history.

(56) References Cited

U.S. PATENT DOCUMENTS

| 8,230,192 | B2 | 7/2012 | Balasubramanian et al. |
| 9,104,482 | B2 | 8/2015 | Merchant et al. |
| 9,594,518 | B2 | 3/2017 | Zhang |
| 2006/0112155 | A1 | 5/2006 | Earl et al. |
| 2011/0066768 | A1 | 3/2011 | Brittner et al. |
| 2013/0014254 | A1* | 1/2013 | Gladwin ............. G06F 11/1084 726/22 |
| 2013/0212340 | A1* | 8/2013 | Berg ....................... G06F 16/27 711/154 |
| 2013/0325823 | A1* | 12/2013 | Resch ................. H04L 63/0823 707/695 |
| 2017/0346760 | A1 | 11/2017 | Kelly |
| 2018/0097707 | A1 | 4/2018 | Wright et al. |

* cited by examiner

*Primary Examiner* — Ernest Unelus
(74) *Attorney, Agent, or Firm* — Garlick & Markison; Timothy W. Markison; Kelly H. Hale

(57) ABSTRACT

A processing module of a memory storage unit includes an interface configured to interface and communicate with a communication system, one or more memory devices, and processing circuitry operably coupled to the interface and to the memory that is configured to receive an access request from a distributed storage network (DSN) client and determine whether a quality of service (QoS) identity for the DSN client is associated with the access request. Based on a determination that a QoS identity is associated with the access request, the processing module determines a QoS level associated with the access request, where the QoS level is based at least in part on the QoS identity that is associated with the access request. The processing module maps the QoS level to a storage layer priority for the access request and transmits the storage layer priority for execution by at least one of the one or more memory devices.

20 Claims, 8 Drawing Sheets

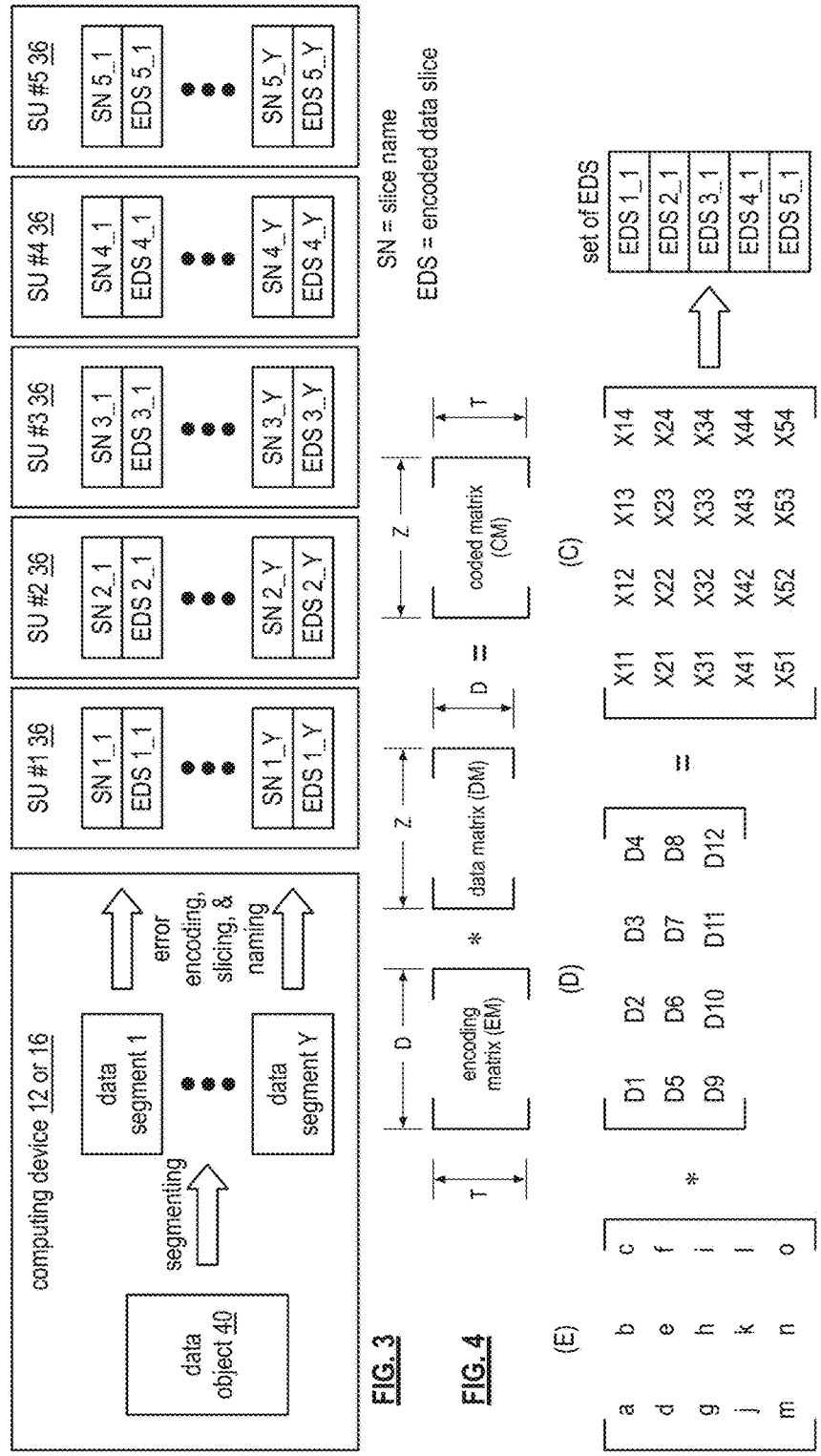

QUALITY OF SERVICE GUARANTEE IN A DISTRIBUTED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
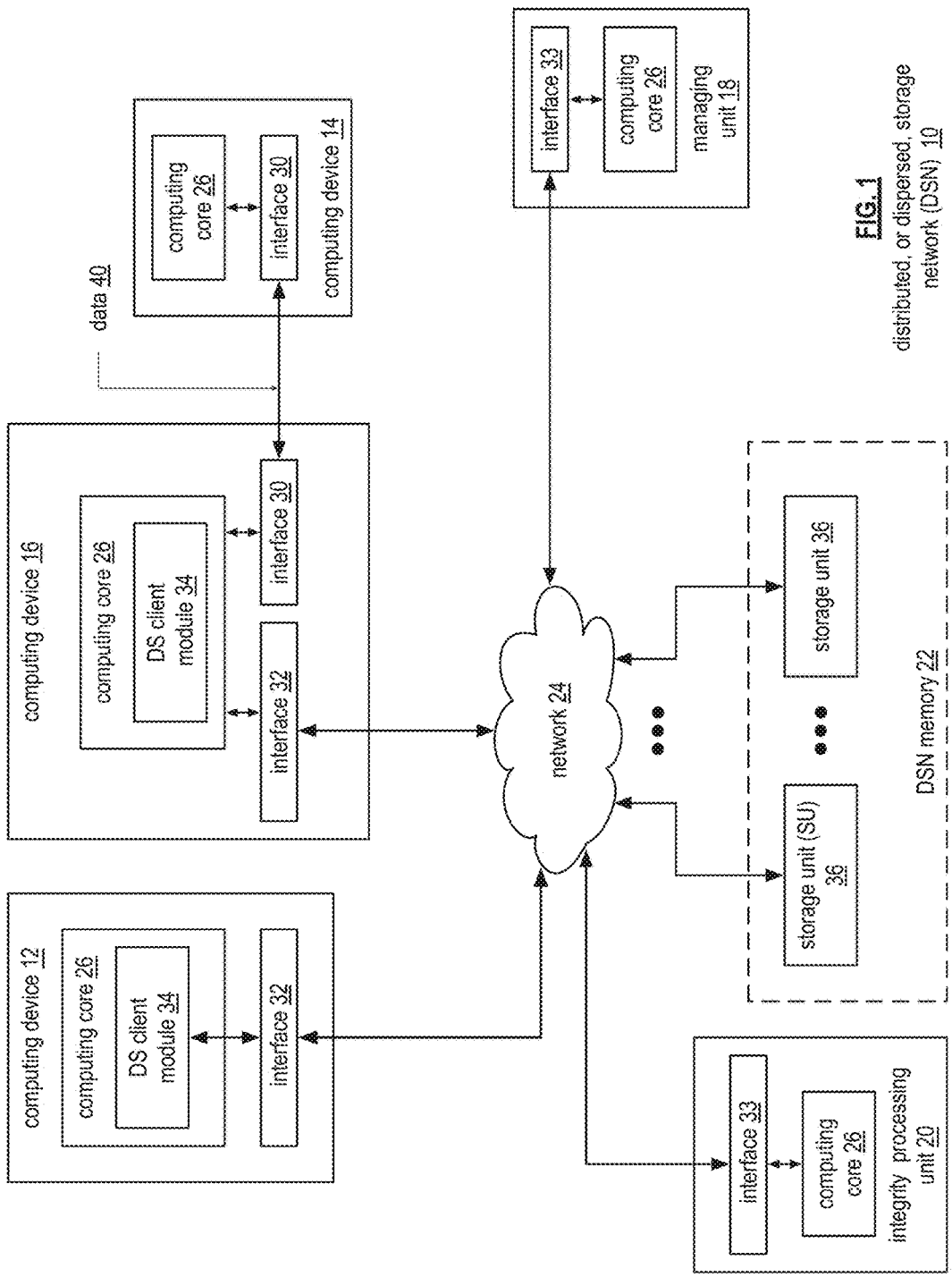
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public interne systems; and/or one or more local area networks (LAN) and/or wide area networks (WAN).

Figure 2:
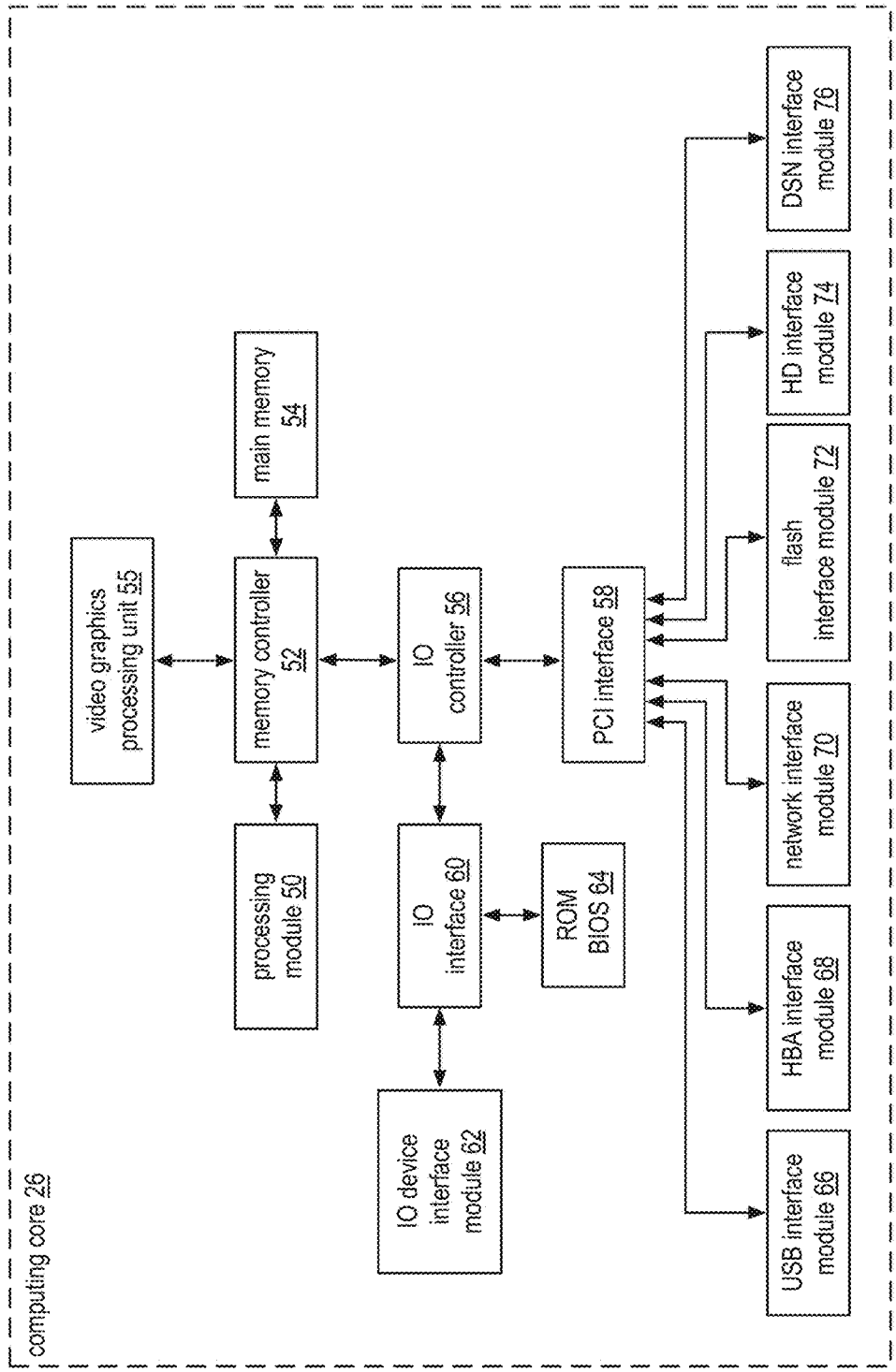
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
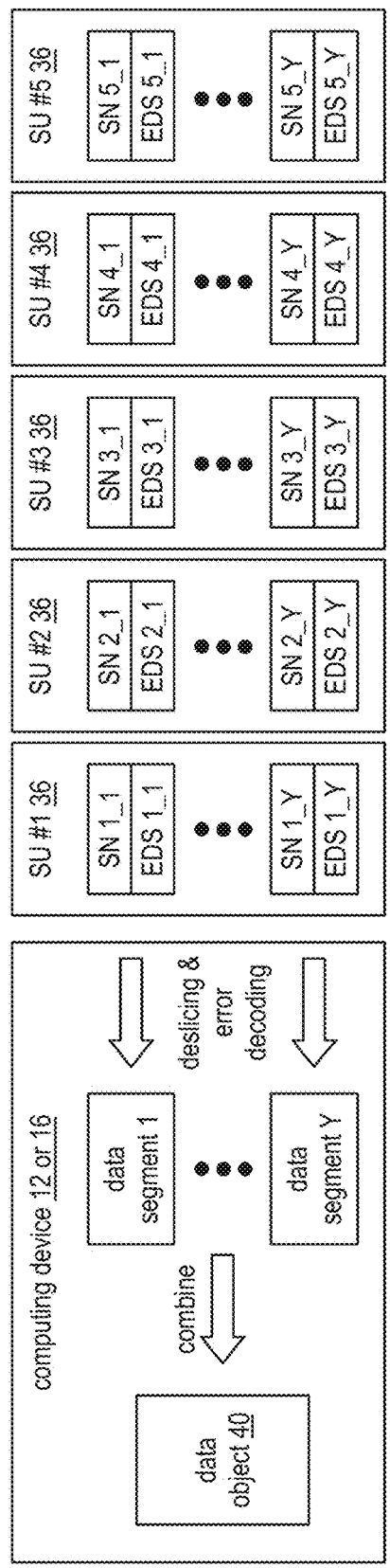
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
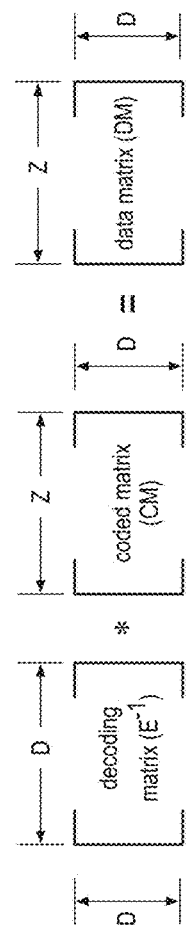
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
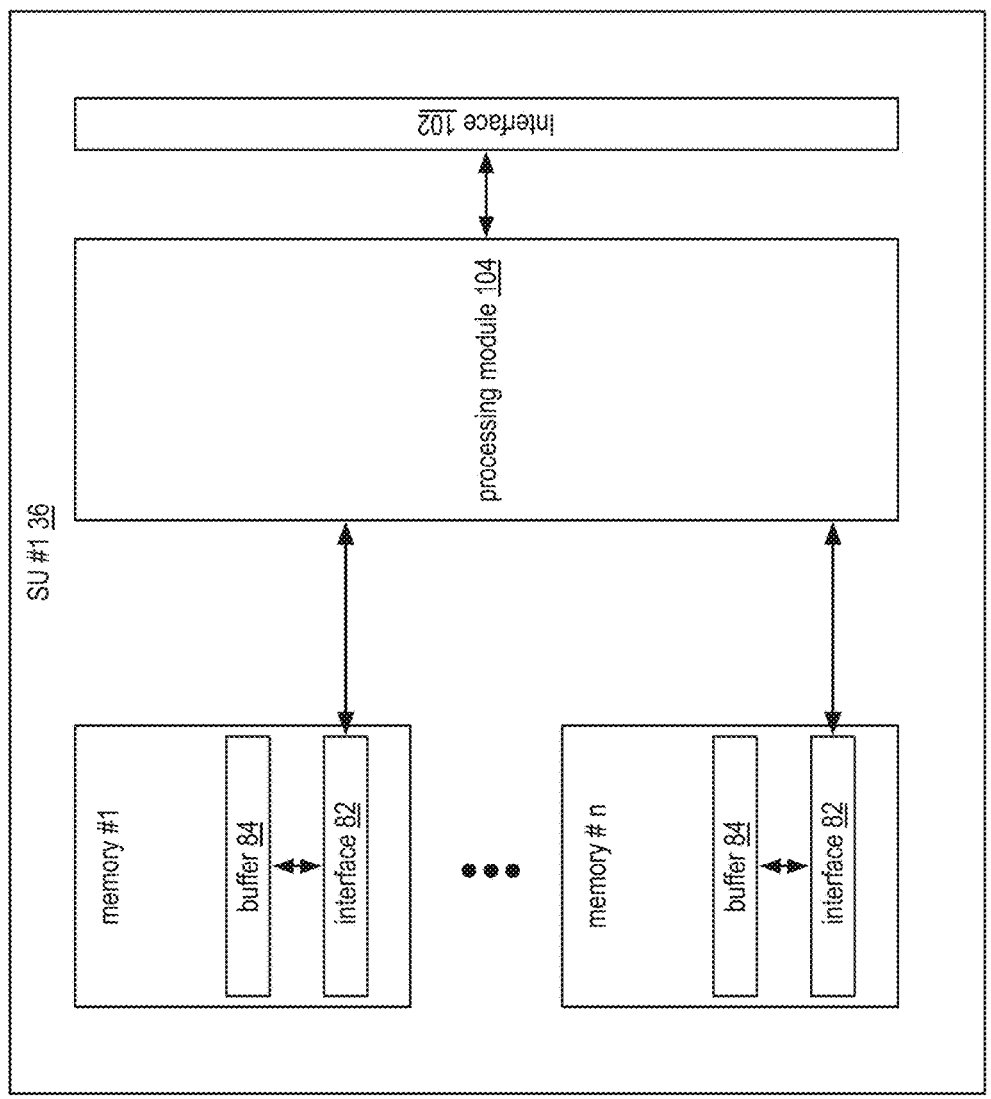
FIG. 9 is a schematic block diagram of an example of memory devices deployed in a dispersed storage network (DSN) in accordance with the present invention.

FIG. 9 is a schematic block diagram of an example of memory devices deployed in a dispersed storage network (DSN). In a DSN, and cloud storage systems generally, user access requests pass through multiple network layers before being serviced. At a minimum, a DSN access request is propagated at the DS client module 34, configured for transmission at computing device 12 and transmitted via network 24 to storage units 36 before being executed by individual memory devices, such as memory 1-n of SU #1-n of DSN memory 22. Certain applications running on the storage network are sensitive to latency, consequently providing for low latency for users of those applications can be an important network attribute. Additionally, some users require higher performance than other users generally and are willing to pay more for DSN services to guarantee such performance. DSNs are inherently beneficial for multi-tenant storage systems, however other tenants, or even a single tenant in a given DSN can introduce undesirable latency when dealing with heavy workloads, or even render the storage system inaccessible to other users on occasion.

The performance of a particular storage network can be described as the storage network's quality of service (QOS) and can be measured as both 1) the overall performance of the storage network; and 2) performance as it relates to a particular transaction over the storage network. Several aspects of storage network service can be considered, such as packet loss, bit rate, throughput, transmission delay, availability, jitter, etc. as measurements of QOS over the storage network. In order to guarantee a particular QOS for a user/transaction it is imperative that any priority requirements are applied to all network layers that handle user requests. Accordingly, the ability of a cloud storage system to provide a QOS guarantee for a particular transaction can hinge on its ability to prioritize an operation all the way from the user request, such as for example DS client module 34, to the individual memory devices responsible for servicing the request, such as memories 1-n of SU#1-SU#n.

Taking into account the various aspects of storage network QOS, a given storage network can maintain end to end QOS guarantees by prioritizing operations at each of the access layer, network layer and storage layer. Such an end-to-end QOS guarantee can be used to enable a "differential QOS", where the storage system can provide higher QOS performance to one or more users. For example, at the user level (access layer) a given user can be associated with a particular QOS level based, at least in part, on a pay-for-QOS mechanism, where the user pays for higher QOS performance. In an example, a storage system could provide QOS at gold, silver and bronze levels, where gold provides the highest guaranteed QOS, followed by incrementally lower guaranteed QOS at the silver level, and the lowest guaranteed QOS (or no guarantee) at the bronze level. In practice the number of QOS guarantees levels could be fewer or significantly greater as needed for a given storage network and/or application. In another example, a QOS level can be based, at least in part, on an application type for the underlying transaction. In yet another example, a given user can identify certain DSN transactions for processing at, for example a bronze level, while reserving gold and silver level service for higher priority transactions.

As described above, storage system QOS guarantees cannot be fulfilled if memory devices executing a user request do not support or are otherwise unable to accommodate the QOS guarantee. For example, a memory device can include one or more data buffers, but unless the storage unit associated with the memory device can organize or manipulate the buffers the guarantee may not be fulfilled. In an example, such as in the Open Systems Interconnect (OSI) model, once a packet associated with a high priority access request moves from a transport layer to the network layer other network entities need to recognize and support the higher priority. In one embodiment, a particular packet may be identified with higher priority identifiers to ensure that it is routed with appropriate priority. For example, when/if the network encounters bandwidth limitations, or other performance related problems, the prioritized packet can be given priority over lower priority network traffic. In an example, before hitting the transport layer there are network layer buffers that need to be allocated, so the network layer may be notified that a higher priority packet is arriving based on a QOS guarantee. The system is thereby able to ensure that the higher priority transaction gets access to the network buffers before lower priority transactions.

Figure 10:
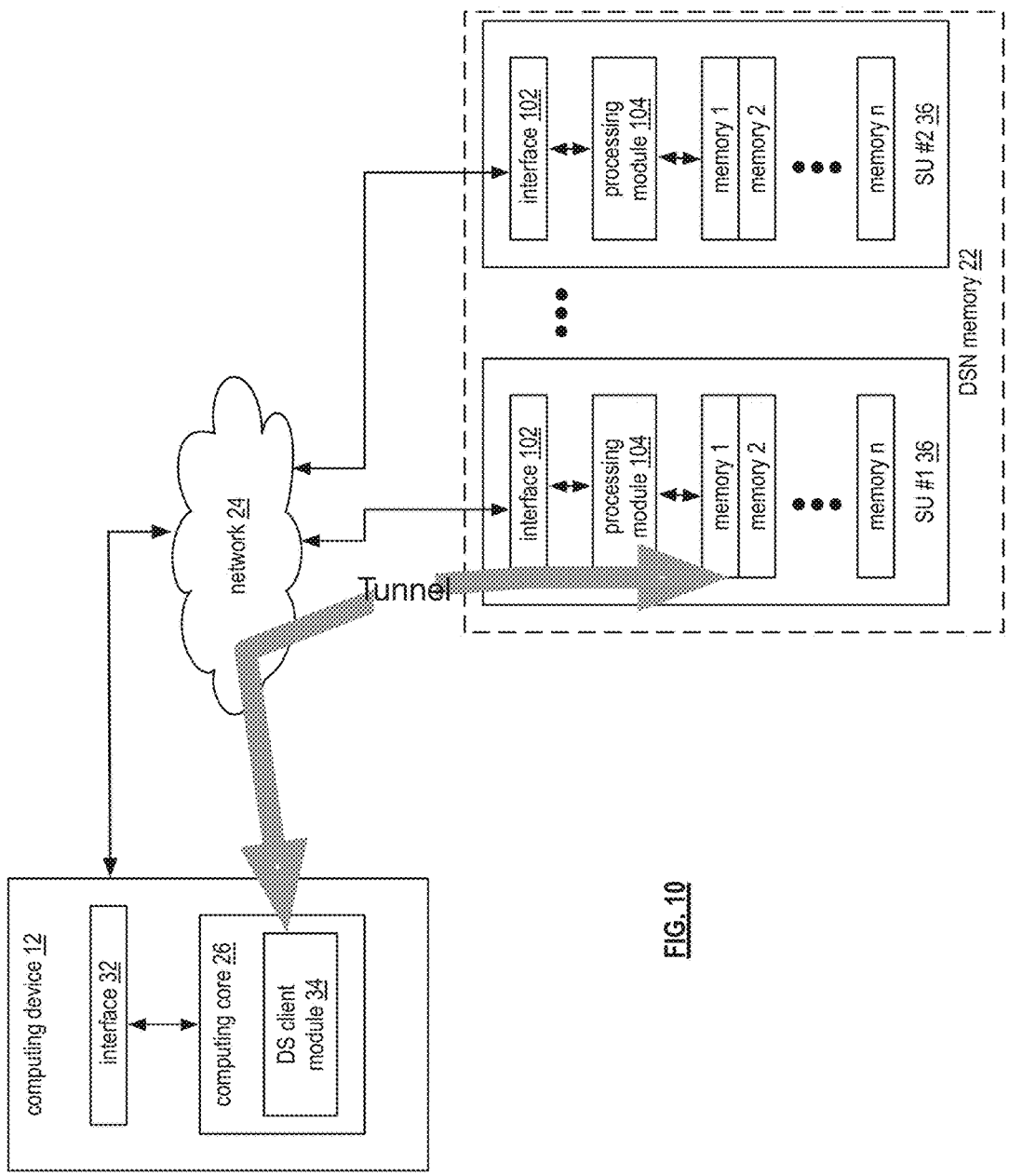
FIG. 10 is a schematic block diagram of an example of an embodiment of a QOS tunneling mechanism in a dispersed storage network (DSN) in accordance with the present invention.

FIG. 10 is a schematic block diagram of an example of an embodiment of a QOS tunneling mechanism in a dispersed storage network (DSN). In an embodiment, a QOS identity is associated with DS client module 34, which is associated with one or more DSN clients or users. In an example the QOS client identity is transmitted through network layers using a tunneling protocol from the DSN client to DSN memory 22 and to storage unit 36. In an example, the tunneling protocol provides for tunneling the QOS identity to one or more of the memory devices tasked with servicing a user access request. Tunneling can involve the use of protocols already in place in the network such as, for example, one or more of point-to-point (PTP), layer 2 tunneling, control layer tunneling and/or an acceptable alternative. In an example, one or more network resources is associated with a resource name and may be adapted to provide QOS resources.

Figure 11:
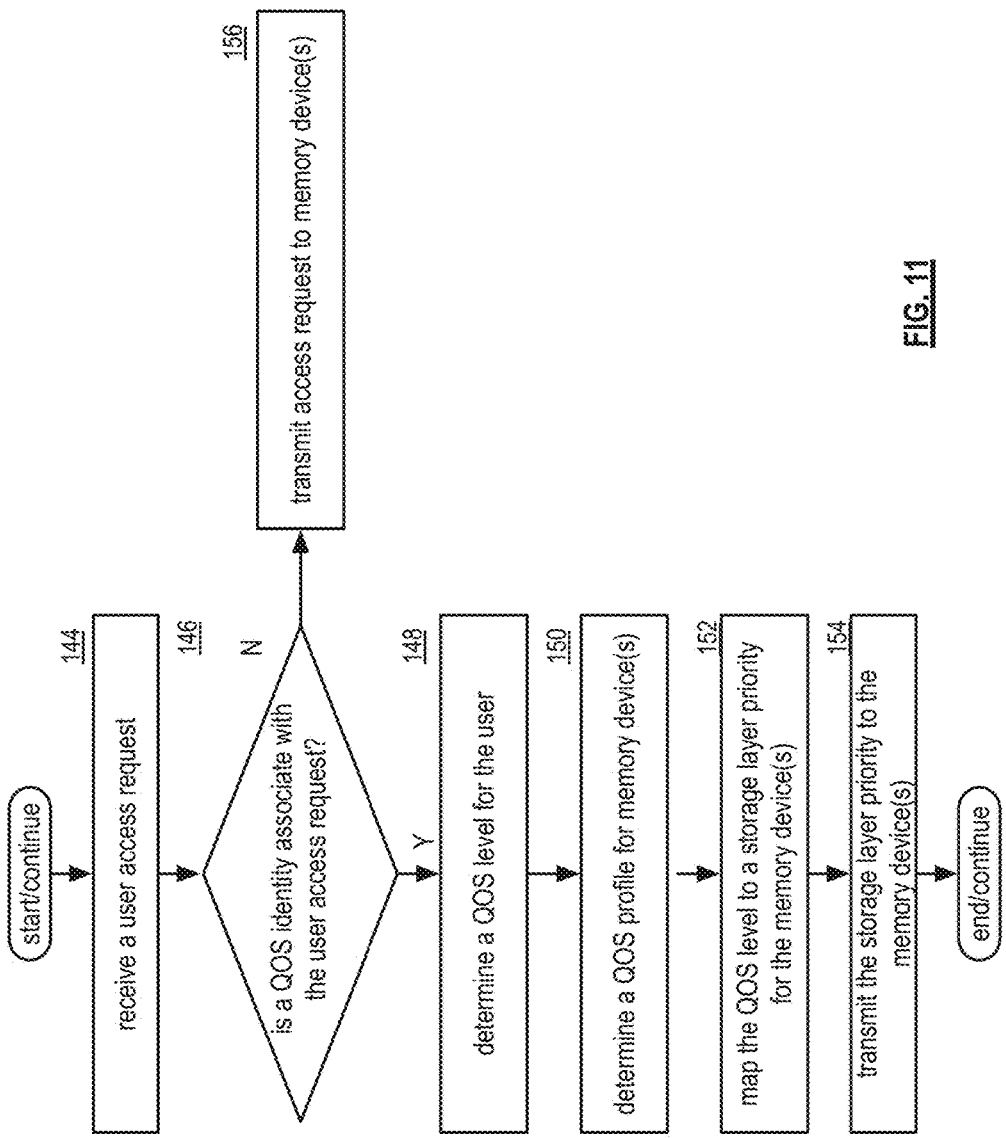
FIG. 11 is a logic diagram of an example of a method for guaranteeing quality of service (QOS) to an end user in a DSN in accordance with the present invention.

FIG. 11 is a logic diagram of an example of a method for guaranteeing quality of service (QOS) to an end user/client in a DSN. The method begins at step 144 where user request is received at a network node. For example, the network node can be a storage unit, such as storage unit 36 from FIG. 1. In another example, the network node can be another node associated with network 24 from FIG. 1, including any of the nodes identified above with respect to FIGS. 9 and 10, above. The method continues at step 146, with a processing unit associated with the network node determining whether a QOS identity is associated with the user access request. When a QOS identity is not associated with the user access request the network node transmits the request to one or more memory devices at step 156, in accordance with a normal (non QOS) operation. A QOS identity can be one or more of a marker from type of service (ToS) field associated with a packet from the user access request, a lookup table indicating QOS levels associated with users, or other indicator associated with the user access request. In an embodiment, the network node supports identity based and resource-based profiling. In another example, a plurality of network resources is associated with one or more QOS performance levels.

When a QOS identity is associated with the user access request the method continues at step 148 with the network node determining a QOS level for the user access request. In an example, the QOS level is calculated using the QOS identity associated with the user access request and a resource-based QOS profile. The method continues at step 150, with the network node determining a QOS profile for one or more memory devices associated with the user access request. In an embodiment, the network node determines the QOS level by evaluating of the higher QOS capabilities of the one or more resources and the QOS level associated with the QOS identity for the user access request. In another embodiment, a weighting mechanism can be used to assign weights to a plurality of QOS levels can be employed. In an example, a given QOS level is mapped to a plurality of storage layer priorities, where the storage layer priorities include a course granularity (such as low and high) or fine granularity (such as 0 to 15, where 15 is high and 0 is low).

The method continues at step 152 where the QOS level is mapped to a storage layer priority (SLP) for the memory device(s). Finally, the network node transmits the SLP of the memory devices(s) at step 154. In an example the SLP is provided to network resources by the DSN client interface layer of storage unit 36. In an example, storage unit 36 maps the SLP according to the interface utilized by the associated memory devices to ensure that a user access request being performed on the memory device is executed according to the computed SLP, such that the priority of execution adequately reflects both the user identity and the QOS capabilities of the one or more memory devices associated with the user request.

In an embodiment, Small Computer System Interface (SCSI) commands can be transported over a transport medium, such as, for example, a Fibre-Channel (FC) connection and leverage the Fibre Channel Protocol (FCP) to prioritize memory operation for access requests with elevated SLP. Alternative command sets can include Internet Protocol (IP), IPI, HIPPI-FP and various audio/video command sets. In an example, the physical memory disk operations can be prioritized to respond to a COMMAND priority associated with a SLP and memory task attributes can be set to ensure that the order of execution of memory tasks is consistent with the command priority. For example, a COMMAND priority can set to SIMPLE for non-priority tasks and HEAD of QUEUE for high priority tasks.

Figure 12:
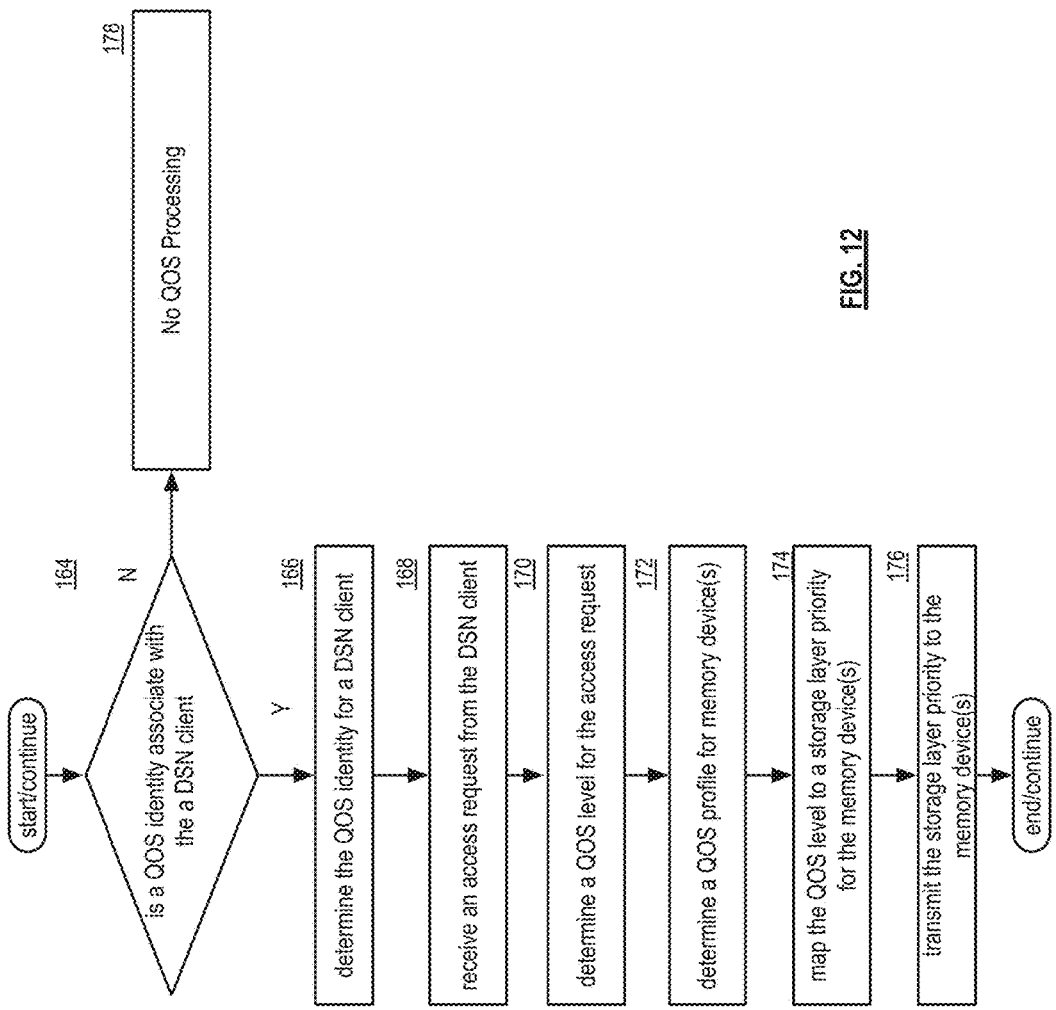
FIG. 12 is a logic diagram of another example of a method for guaranteeing quality of service (QOS) to an end user in a DSN in accordance with the present invention.

FIG. 12 is a logic diagram of another example of a method for guaranteeing quality of service (QOS) to an end user in a DSN. The method begins at step 164 with a processing unit associated with a network node determining whether a DSN client is associated with a QOS identity. The network node can be a storage unit, such as storage unit 36 from FIG. 1. In another example, the network node can be another node associated with network 24 from FIG. 1, including any of the nodes identified above with respect to FIGS. 9 and 10, above. When there is no QOS identity associated with the DSN client the network node processes an user access requests from the DSN client without regard to QOS. When there is a QOS identity associated with the DSN client the method continues at step 166, with a processing unit associated with the network node determines the QOS identity of the DSN client.

The method continues at step 168 where a user request from the DSN client is received at a network node and continues at step 170, where a QOS identity is associated with the user access request. The method continues at step 148 with the network node determining a QOS level for the user access request. The method continues at step 172, with the network node determining a QOS profile for one or more memory devices associated with the user access request. with the network node determining a QOS level for the user access request. The method continues at step 152 where the QOS level is mapped to a storage layer priority (SLP) for the memory device(s) and finally, the network node transmits the SLP of the memory devices(s) at step 176.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
   receiving an access request from a DSN client for one or more dispersed error encoded data slices, wherein a data object is segmented to create a plurality of data segments and wherein each data segment of the plurality of data segments is dispersed error encoded to produce a set of encoded data slices;
   determining whether a quality of service (QoS) identity for the DSN client is associated with the access request;
   based on a determination that the QoS identity is associated with the access request, determining a QoS level associated with the access request, wherein the QoS level is based at least in part on the QoS identity that is associated with the access request and a resource profile for the one or more memory devices;
   mapping the QoS level to a storage layer priority for the access request; and transmitting the storage layer priority to the one or more memory devices.

2. The method of claim 1, wherein the QoS identity indicates at least one of a low, high and median QOS, wherein a high QOS indicates high priority.

3. The method of claim 1, wherein the DSN client is at least one of a DSN user, an application associated with the DSN and a DSN management function.

4. The method of claim 1, wherein each of the one or more memory devices associated with the access request includes a data buffer.

5. The method of claim 4, wherein the data buffer includes a queueing algorithm and a queue position for access request is based at least partially on the storage layer priority.

6. The method of claim 5, wherein a SCSI command priority is associated with the storage layer priority and the SCSI command priority is at least one of SIMPLE task and HEAD of QUEUE task.

7. The method of claim 1, wherein a transport medium for the access request includes one or more Fibre-Channels (FCs), wherein the one or more FCs is adapted for Small Computer System Interface (SCSI) commands.

8. The method of claim 1, wherein one or more memory devices are identified by a resource name, further wherein the resource name is associated with a QOS profile for the one or more memory devices.

9. The method of claim 1, wherein one or more end user identities is associated to a QoS level.

10. A method for execution by one or more processing modules of one or more computing devices of a dispersed storage network (DSN), the method comprises:
   determining whether a quality of service (QoS) identity is associated with a DSN client;
   receiving an access request from the DSN client for one or more dispersed error encoded data slices, wherein a data object is segmented to create a plurality of data segments and wherein each data segment of the plurality of data segments is dispersed error encoded to produce a set of encoded data slices;
   based on a determination that the QoS identity is associated with the access request, determining a QoS level associated with the access request, wherein the QoS level is based at least in part on the QoS identity that is associated with the access request and a resource profile for the one or more memory devices;
   mapping the QoS level to a storage layer priority for the access request; and
   transmitting the storage layer priority to the one or more memory devices.

11. The method of claim 10, wherein the QoS identity indicates at least one of a low, high and median QOS, wherein a high QOS indicates high priority.

12. The method of claim 10, wherein the DSN client is at least one of a DSN user, an application associated with the DSN and a DSN management function.

13. The method of claim 10, wherein each of the one or more memory devices associated with the access request includes a data buffer.

14. The method of claim 13, wherein the data buffer includes a queueing algorithm and a queue position for access request is based at least partially on the storage layer priority.

15. The method of claim 10, wherein a transport medium for the access request includes one or more Fibre-Channels (FCs), wherein the one or more FCs is adapted for Small Computer System Interface (SCSI) commands.

16. The method of claim 15, wherein a SCSI command priority is associated with the storage layer priority and the SCSI command priority is at least one of SIMPLE task and HEAD of QUEUE task.

17. The method of claim 10, wherein one or more memory devices are identified by a resource name, further wherein the resource name is associate with a QOS profile for the one or more memory devices.

18. The method of claim 10, wherein one or more end user identities is associated to a QoS level.

19. A storage unit comprises:
   an interface for interfacing with a network;
   one or more memory devices; and
   a processing module operably coupled to the interface and to the one or more memory devices, wherein the processing module is operable to:
      receive an access request from a DSN client for one or more dispersed error encoded data slices, wherein a data object is segmented to create a plurality of data segments and wherein each data segment of the plurality of data segments is dispersed error encoded to produce a set of encoded data slices;
      determine whether a quality of service (QoS) identity for the DSN client is associated with the access request;
      based on a determination that the QoS identity is associated with the access request, determine a QoS level associated with the access request, wherein the QoS level is based at least in part on the QoS identity that is associated with the access request and a resource profile for the one or more memory devices;
      map the QoS level to a storage layer priority for the access request; and
      transmit the storage layer priority to the one or more memory devices.

20. The storage unit of claim 19, wherein the QoS identity indicates at least one of a low QOS and high QOS, wherein a high QOS indicates high priority.

* * * * *